Oct. 22, 1940.   A. E. JOHNSON   2,218,712
VARIABLE SPEED CONTROL FOR THE TRANSMISSION OF POWER
Filed April 10, 1939   2 Sheets-Sheet 1
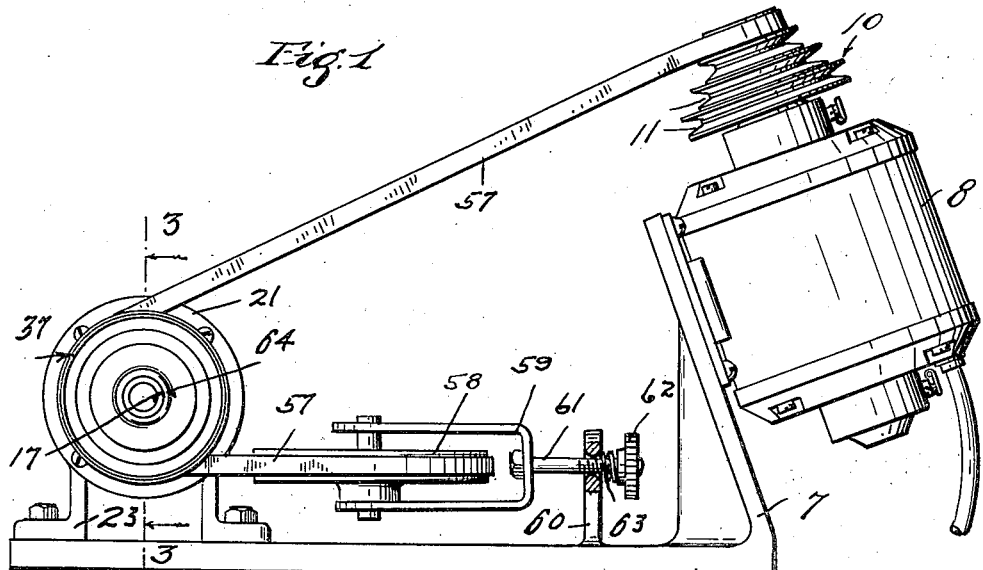
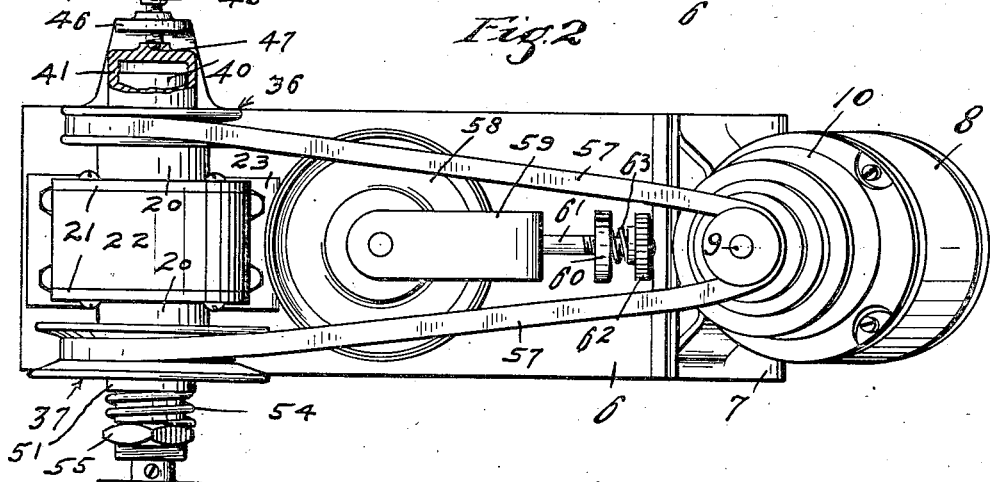
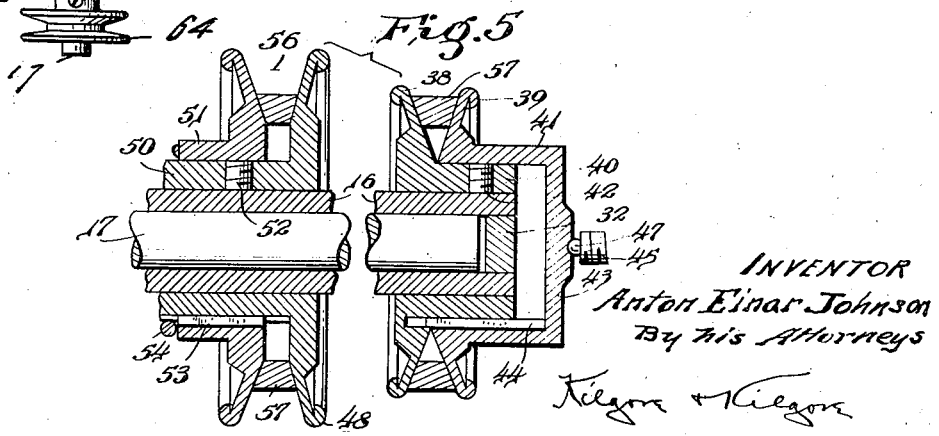
INVENTOR
Anton Einar Johnson
By his Attorneys

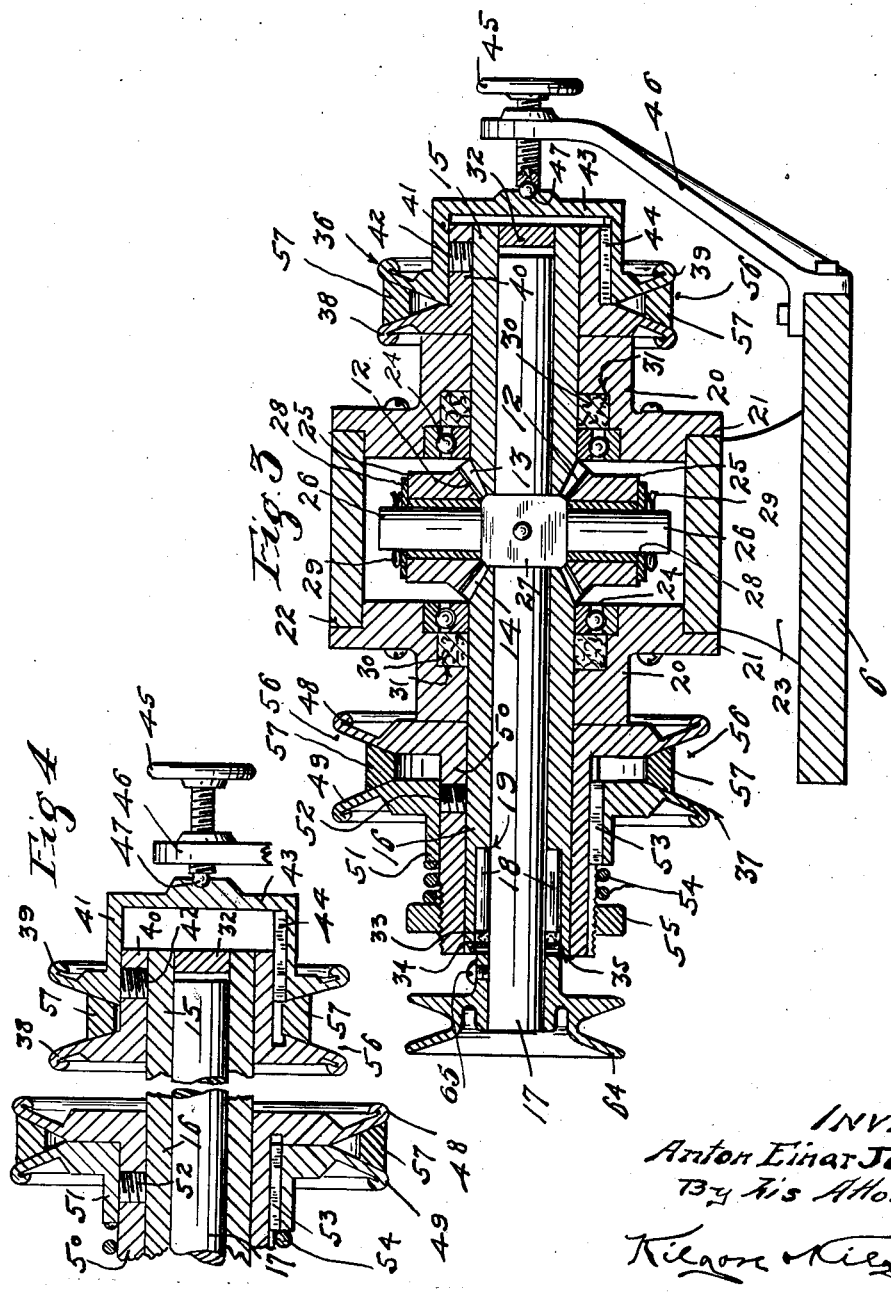

Patented Oct. 22, 1940

2,218,712

UNITED STATES PATENT OFFICE 2,218,712

VARIABLE SPEED CONTROL FOR THE TRANSMISSION OF POWER

Anton Einar Johnson, Minneapolis, Minn.

Application April 10, 1939, Serial No. 267,009

9 Claims. (Cl. 74,286)

My invention relates to a variable speed control for the transmission of power from a driving member to a driven member. The invention, while intended for general use, is especially well adapted for use in connection with electric motors, gas engines, and the like.

Variable speed devices now in general use, start at the speed of the motor or the driven member and work down to the desired speed.

The object of this invention is to provide a variable speed control in which the driven member starts at zero and works up.

These and other objects and advantages of the invention will be fully set forth in the description made in connection with the accompanying drawings.

To the above end, generally stated, the invention consists of the novel devices and combinations of devices hereinafter described and defined in the claims.

In the accompanying drawings, which illustrate the invention, like characters indicate like parts throughout the several views.

Referring to the drawings:

Fig. 1 is a side elevation of the invention;

Fig. 2 is a plan view of the same;

Fig. 3 is a view principally in section taken on the line 3—3 of Fig. 1, on an enlarged scale;

Fig. 4 is a fragmentary detail view principally in section, showing the variable speed pulleys in different adjustment from that shown in Fig. 3, and Fig. 5 is a detail view corresponding to Fig. 4, but showing only the peripherial portions of the pulleys, with said pulleys in another adjustment.

The numeral 6 indicates a flat main base having on its right hand end, relative to Figs. 1 and 2, an upstanding motor base 7 which is inwardly inclined over said main base.

An electric motor, indicated as an entirety by the numeral 8 with the exception of its armature shaft 9, is mounted on the motor base 7.

The armature shaft 9, which extends parallel to the motor base 7, has keyed to its upper end portion, a four-step pulley 10 having V-grooves 11.

A variable speed control, mounted on the opposite end of the main base 6 from the electric motor 8 includes a pair of diametrically opposite differential compensating pinions 12 which mesh with a pair of axially aligned driving pinions 13 and 14. The driving pinions 13 and 14 having long hubs, 15 and 16 respectively, and which hubs project in opposite directions and are turnably mounted on a main shaft 17. Roller bearings 18 for the hub 16 are mounted in a recess 19 in the outer end portion of said hub and support said hub on the shaft 17.

The hubs 15 and 16 extend endwise through hubs 20 on the removable heads 21 of an annular housing 22 for the pinions 12, 13, and 14. This housing 22 has a pair of wide legs 23 bolted to the main base 6 and supports the shaft 17 in a horizontal position transversely of the main base 6. Ball bearings 24 mounted in recesses, in the inner faces of the housing end members 21 are interposed between said members and the hubs 15 and 16. The hubs 25 of the compensating pinions 12 are loosely journaled on a pair of axially aligned stub shafts 26 which are rigidly secured at their inner ends to the main shaft 17, as indicated at 27, and extend radially therefrom.

Washers 28 and cotter pins 29 on the outer end portions of the stub shafts 26 hold the pinions 12 and their hubs 25 against outwardly endwise movement on said shafts.

In actual practice the housing 22 will be filled with oil or grease and to prevent the escape of the same therefrom along the hubs 15 and 16 and the shaft 17, packings 30 are mounted in recesses 31 back of the ball bearings 24, the outer end of the hub 15 is closed by a plug 32 and a packing 33 is held in the recess 19 outwardly of the roller bearings 18 by a washer 34 and a divided spring ring 35.

A manually set variable speed pulley 36 is mounted on the hub 15 and an automatic compensating pulley 37 is mounted on the hub 16. Each pulley 36 and 37 is circumferentially divided and the former thereof comprises a relatively fixed member 38 and a relatively movable member 39. The pulley member 38 has a long hub 40 that extends outwardly therefrom and is mounted on the hub 15 and the pulley member 39 has an outwardly projecting hub 41 mounted on the hub 40. The pulley member 38 impinges against the outer end of the respective hub 20 and is removably but rigidly secured to the hub 15, for rotation therewith, by set screws 42 having threaded engagement with the hub 41 and impinge against the hub 15. A cap 43 integral with the outer end of the hub 41 covers the respective ends of the hubs 15 and 40, and the plug 32. A key 44 connects the pulley member 38 for common rotation therewith but permits axial adjustment of the pulley member 39 relative to the pulley member 38.

The pulley member 39 may be positively moved toward the pulley member 38 and positively held against axial movement therefrom by a hand-screw 45. This hand-screw 45 has threaded engagement with a bracket 46 fixed to the main base 6 and is engaged at its inner end by the cap 43. An anti-friction ball 47 is interposed between the inner end of the hand-screw 45 and a seat therefor, is a boss on the outer face of the cap 43.

The pulley 37 comprises a relatively fixed member 48 and a relatively movable member 49, the former of which has a long outwardly projecting hub 50 mounted on the hub 16 and the latter of which has an outwardly projecting hub 51 mounted on the hub 50.

The pulley member 48 impinges against the outer end of the respective hub 20 and is held for common rotation with the hub 16 by a set-screw 52. This set-screw 52 has threaded engagement with the hub 50 and impinges against the hub 16. A key 53 connects the hub 51 to the hub 50 for common rotation therewith, but permits free axial movement of the hub 51 on the hub 50.

The pulley member 49 is yieldingly pressed toward the pulley member 48 by a coiled spring 54 encircling the hub 50 and compressed between the outer end of the hub 50 and a nut 55 that has threaded engagement with the hub 50. The tension of the spring 54 may be varied at will, by adjusting the nut 55 on the hub 50.

V-grooves 56 are formed in the pulleys 36 and 37 by the opposing faces of the pulley members 38 and 39 and 48 and 49 which are in outwardly diverging relation. An endless V-belt 57 drives the pulleys 36 and 37 in opposite directions from the step pulley 10. This belt 57, as shown, runs in the groove 11 of the step pulley 10 having the smallest diameter. From the pulley 10 the belt 57 runs over and under the pulley 36, around a directional sheave 58, under and over the pulley 37 and back to the step pulley 10. The direction of the run of the belt 57 as it passes around the sheave 58, which is between the pulleys 36 and 37, is changed and hence rotates said pulleys in opposite directions.

The directional sheave 58 is journaled in a clevis-like member 59 adjustably anchored to a post 60 by a bolt 61 having on its outer end a thumb-nut 62. Said post 60 is rigidly secured to the main base 6 and the bolt extends through an aperture in said post.

A neutral tension member 63, in the form of a coiled spring encircling the bolt 61, between the post 60 and the nut 62, permits movement of the directional sheave 58 toward the pulleys 36 and 37 to put slack in the belt 57 in case of undue tension being placed thereon. In case the automatic compensating pulley 37 is slow to act, in its adjustment, during the initial manual adjustment of the pulley 36 to change the speed thereof, the spring 63 will yield and compensate for the temporary increased active diameter of one of the pulleys 36 and 37 relative to the other.

By manipulating the thumb-nut 62, the directional sheave 58 may be moved toward or from the post 60 and thereby act as a belt tightener to hold the belt 57 under the desired tension.

An output pulley 64 is mounted on the left hand end of the shaft 17, in reference to Fig. 3, and secured thereto by a set-screw 65 for common rotation therewith.

Figs. 1, 2, and 3 show the pulleys 36 and 37 adjusted to position the belt 57 therein for driving the oppositely moving pulleys 36 and 37 at different speeds so that motion is imparted to the shaft 17 and hence the output pulley 64.

The pulleys 36 and 37 are shown in Fig. 4 adjusted to position the belt 57 therein for driving the shaft 17 and hence the output pulley 64 at top speed. Of course this speed may be varied at will by shifting the belt 57 in the different grooves 11 of the step pulley 10.

Fig. 5 shows an adjustment of the pulleys 36 and 37 in which the belt 57 is held therein in an intermediate position for driving the reversely moving pulleys 36 and 37 in opposite directions at the same rate of speed so that no motion is imparted to the shaft 17 and hence the output pulley 64 is idle. By adjusting the pulleys 36 and 37 to move the belt 57, from its intermediate position, outwardly in one of the pulleys and inwardly in the other thereof, the output pulley 63 will be rotated in a given direction and at a speed that starts at zero and may be progressively increased. On the other hand, by adjusting the pulleys 36 and 37 to move the belt 57 in said pulleys, from its intermediate position, in opposite directions from those above stated, the direction of rotation of the output pulley 64 will be reversed and the speed thereof will start at zero and may be progressively increased.

From the above description it is evident that by simply manipulating the hand-screw 45, the output pulley 64 may be rotated either forward or in reverse. It is also evident that the rotation of the output pulley 64 may be started at zero and progressively increased.

From the foregoing, it is evident that the invention herein described is capable of a large range of modifications within the spirit of the invention herein disclosed and claimed.

What I claim is:

1. A device of the kind described comprising a driving member and a driven member, power means for operating the driving member, differential drive mechanism from the driving member to the driven member including a pair of variable speed pulleys, a belt directional member, a single belt arranged to run over said driving member, pulleys and directional member, the directional member guiding the belt to drive the pulleys in opposite directions, and means for adjusting the reversely moving pulleys to a speed at which the driven member will remain idle or at a speed that may be progressively increased from zero up.

2. A device of the kind described comprising a driving member and a driven member, power means for operating the driving member, differential drive mechanism from the driving member to the driven member including a pair of variable speed pulleys, a belt directional member, a single belt arranged to run over said driving member, pulleys and directional member guiding the belt to drive the pulleys in opposite directions, and means for adjusting the reversely moving pulleys to hold the belt thereon in an intermediate position and at a speed at which the driven member will remain idle, said pulleys also being adjustable by said means to move the belt either inwardly or outwardly on said pulleys from said intermediate position, whereby the driven member may be operated either forward or in reverse and at a speed that may be progressively increased from zero up.

3. A device of the kind described comprising a driving member and a driven member, power means for operating the driving member, differential drive mechanism from the driving member to the driven member including a manually controlled variable speed pulley and an automatic compensating pulley, a belt directional member, and a belt arranged to run over said driving member, pulleys and directional member, the directional member guiding the belt to drive the pulleys in opposite directions, said manually controlled pulley being adjustable to a speed at which the driven member will remain idle or at a speed that may be progressively increased from zero up.

4. A device of the kind described comprising a driving member and a driven member, power means for operating the driving member, differential drive mechanism from the driving member to the driven member including a manually controlled variable speed pulley and an automatic compensating pulley, a directional member and a belt arranged to run over said driving member, pulleys and directional member, the directional member guiding the belt to drive the pulleys in opposite directions, said manually controlled pulley being adjustable to operate the driven member either forward or in reverse and at a speed at which the driven member will remain idle or at a speed that may be progressively increased from zero up.

5. A device of the kind described comprising a driving member, power means for operating the driving member, a main shaft, a pair of compensating pinions carried by the main shaft with their axes extending radially therefrom, a pair of variable speed pulleys each having a driving pinion meshing with said compensating pinions, a belt directional member, a single belt arranged to run over said driving member, pulleys and directional member, the directional member holding the belt to drive the pulleys in opposite directions, and means for adjusting the reversely moving pulleys, to a speed at which the main shaft will remain idle or at a speed that may be progressively increased from zero up.

6. A device of the kind described comprising a driving member, power means for operating the driving member, a main shaft, a pair of compensating pinions carried by the main shaft with their axes extending radially therefrom, a manually controlled variable speed pulley, an automatic compensating pulley, and a belt directional member guiding the belt to drive said pulleys in opposite directions, said manually controlled pulley being adjustable to a speed at which the main shaft will remain idle or at a speed that may be progressively increased from zero up.

7. A device of the kind described comprising a driving member, power means for operating the driving member, a main shaft having at its intermediate position a pair of axially aligned radially projecting stub shafts, a compensating pinion journaled on each stub shaft, a pair of driving pinions meshing with the compensating pinions and having hubs in which the main shaft is journaled, a manually controlled variable speed pulley mounted on the hub of one of the driving pinions, an automatic compensating pulley mounted on the hub of the other driving pinion, each of said pulleys having a V-groove and a relatively fixed member and a relatively movable member, the movable pulley members being secured to the hubs of the respective driving pinions for common rotation therewith, manually operated means for adjusting the movable member of the manually controlled pulley toward the fixed member thereof, a spring under strain to move the movable member of the compensating pulley toward the fixed member thereof, a belt directional sheave, and a belt arranged to run over the driving member, pulleys and sheave, the sheave guiding the belt to drive said pulleys in opposite directions.

8. The structure defined in claim 7 which further includes a neutral tension member holding the sheave and arranged to yield when the belt is placed under undue tension.

9. A device of the kind described comprising a driving member and a driven member, a positively controlled variable speed member, an automatically controlled variable speed compensating member, said two variable speed members being independently movable, means for driving said variable speed members in opposite directions, and means for positively adjusting said positively controlled variable speed member to a speed at which the driven member will remain idle or at a speed that may be progressively increased from zero up.

ANTON EINAR JOHNSON.